United States Patent
Janssen et al.

(10) Patent No.: US 12,032,173 B2
(45) Date of Patent: Jul. 9, 2024

(54) INTEGRATED OPTICAL LOCKER

(71) Applicant: Lumentum Operations LLC, San Jose, CA (US)

(72) Inventors: Adrian Perrin Janssen, Devon (GB); Nivesh Mangal, Oxfordshire (GB)

(73) Assignee: Lumentum Operations LLC, San Jose, CA (US)

( * ) Notice: Subject to any disclaimer, the term of this patent is extended or adjusted under 35 U.S.C. 154(b) by 366 days.

(21) Appl. No.: 17/449,392

(22) Filed: Sep. 29, 2021

(65) Prior Publication Data
US 2022/0365358 A1 Nov. 17, 2022

Related U.S. Application Data

(60) Provisional application No. 63/201,623, filed on May 6, 2021.

(51) Int. Cl.
| | | |
|---|---|---|
| *G02B 27/14* | (2006.01) | |
| *G01J 1/04* | (2006.01) | |
| *G01J 1/44* | (2006.01) | |
| *G02B 27/10* | (2006.01) | |

(52) U.S. Cl.
CPC .......... *G02B 27/14* (2013.01); *G01J 1/0414* (2013.01); *G01J 1/44* (2013.01); *G02B 27/108* (2013.01)

(58) Field of Classification Search
CPC .... G02B 27/14; G02B 27/108; G02B 27/146; G02B 5/284; G01J 1/0414; G01J 1/44; G01J 9/0246
See application file for complete search history.

(56) References Cited

U.S. PATENT DOCUMENTS

| | | | | |
|---|---|---|---|---|
| 2003/0067948 A1* | 4/2003 | Tatsuno | ................ | H01S 5/0687 372/32 |
| 2003/0072542 A1* | 4/2003 | Furuichi | ............ | G02B 6/29395 385/33 |
| 2003/0076564 A1* | 4/2003 | Furuichi | ............... | H01S 5/0687 398/129 |
| 2004/0105098 A1* | 6/2004 | Rella | ..................... | G01J 9/0246 356/519 |
| 2009/0123879 A1* | 5/2009 | Hidaka | ................. | G03F 9/7034 430/325 |
| 2011/0076023 A1* | 3/2011 | Chen | .................. | G02B 6/29358 398/119 |
| 2012/0140606 A1* | 6/2012 | Watabe | ................ | G11B 7/1381 |

(Continued)

*Primary Examiner* — Tarifur R Chowdhury
*Assistant Examiner* — Carlos Perez-Guzman
(74) *Attorney, Agent, or Firm* — Harrity & Harrity, LLP

(57) ABSTRACT

An optical assembly includes an optical cavity; an output detector; a reference detector; and a plate beam splitter, wherein the plate beam splitter has a first face and a second face, and is configured to form, from an input beam: a first output beam, that passes through the optical cavity and impinges the output detector, a first reference beam that impinges on the reference detector, a second output beam parallel to the first output beam, and a second reference beam parallel to the first reference beam; one of the first output beam or the first reference beam is a reflection of the input beam in the first face of the plate beam splitter; the output detector is configured to exclude at least a portion of the second output beam; and the reference detector is configured to exclude at least a portion of the second reference beam.

20 Claims, 14 Drawing Sheets

(56) References Cited

U.S. PATENT DOCUMENTS

| | | | |
|---|---|---|---|
| 2013/0119243 A1* | 5/2013 | Yuan | G01J 1/0228 |
| | | | 250/227.26 |
| 2015/0378186 A1* | 12/2015 | Xiong | G02B 6/4286 |
| | | | 359/484.04 |
| 2017/0302051 A1* | 10/2017 | Xiong | H01S 3/08027 |

* cited by examiner

US 12,032,173 B2

INTEGRATED OPTICAL LOCKER

RELATED APPLICATION

This application claims priority to U.S. Provisional Patent Application No. 63/201,623, entitled "INTEGRATED OPTICAL LOCKER," filed on May 6, 2021, the content of which is incorporated by reference herein in its entirety.

TECHNICAL FIELD

The present invention relates to free-space optical components and to an optical assembly, for example, for use in an optical locker.

BACKGROUND

An optical locker is a control device for an optical system which "locks" an optical signal (typically a laser source) to a desired wavelength or frequency. An optical locker comprises an optical assembly for measuring the wavelength or frequency of the optical signal, and a controller implementing a feedback loop, which adjusts the source of the optical signal in dependence upon the measurement.

Typically, the optical assembly comprises an etalon, also known as a Fabry-Perot interferometer. In order to normalize the etalon response, such as to ensure that the measurements used for the feedback loop are independent of the power of the source of the optical signal, the optical signal is typically measured both before and after passing through the etalon. This is achieved by the use of a beam splitter between the optical source and the etalon, with one output of the beam splitter being passed straight to a detector, and the other passing through the etalon before being measured by a different detector. The measurement before passing through the etalon (the "reference measurement") is a measure of the overall power of the optical signal, independent of wavelength. The measurement after passing through the etalon (the "output measurement") is dependent on the wavelength of the optical signal and its power. As such, by taking the ratio (or other suitable transformation) of the reference measurement and the output measurement, an overall measurement can be obtained which only depends on the wavelength.

Optical assemblies as described above can provide very accurate measurements of wavelength. However, their sensitivity also makes them vulnerable to interference, as stray light being picked up by either detector can severely compromise their precision. In addition, the optical assembly comprises several precision components which must be properly aligned for the optical locker to function. Additionally, the number of components required is significant (at minimum, a beam splitter, an etalon, and two detectors—and usually at least one mirror or other optical component used to route the light), and this results in the optical assembly taking up a lot of space, which is a design challenge for the use of optical lockers in small-scale devices.

SUMMARY

In some implementations, an optical assembly includes an optical cavity; an output detector; a reference detector; and a plate beam splitter, wherein the plate beam splitter has a first face and a second face, and is configured to form, from an input beam: a first output beam, that passes through the optical cavity and impinges the output detector, a first reference beam that impinges on the reference detector, a second output beam parallel to the first output beam, and a second reference beam parallel to the first reference beam; one of the first output beam or the first reference beam is a reflection of the input beam in the first face of the plate beam splitter; the output detector is configured to exclude at least a portion of the second output beam; and the reference detector is configured to exclude at least a portion of the second reference beam.

In some implementations, an optical assembly includes an optical cavity; an output detector configured to receive light transmitted through the optical cavity; a reference detector; and a plate beam splitter located adjacent to an input face of the optical cavity, and slanted at an angle θ to the input face, the plate beam splitter configured to split an input beam into a first output beam that passes through the optical cavity to the output detector, and a first reference beam that strikes the reference detector, wherein the output detector and reference detector are configured such that: the output detector detects light from the first output beam and from a second output beam located parallel to and a perpendicular distance $$p = 2s \tan\frac{\theta}{n}\cos\theta$$

from the first output beam, where s is the thickness of the plate beam splitter and n is the refractive index of the plate beam splitter, wherein a power ratio of the first output beam to the second output beam as detected by the output detector is greater than a threshold, and the reference detector detects light from the first reference beam and from a second reference beam located parallel to and a perpendicular distance $$p = 2s \tan\frac{\theta}{n}\cos\theta$$

from the first reference beam, wherein a power ratio of the first reference beam to the second reference beam as detected by the reference detector is greater than the threshold.

In some implementations, an optical system includes an optical assembly, including: an optical cavity; an output detector; a reference detector; and a plate beam splitter, wherein: the plate beam splitter has a first face and a second face, and is configured to form, from an input beam: a first output beam, that passes through the optical cavity and impinges the output detector, a first reference beam that impinges on the reference detector, a second output beam parallel to the first output beam, and a second reference beam parallel to the first reference beam; one of the first output beam or the first reference beam is a reflection of the input beam in the first face of the plate beam splitter, the output detector is configured to exclude at least a portion of the second output beam, and the reference detector is configured to exclude at least a portion of the second reference beam; and an optical device configured to provide the input beam to the optical assembly, wherein the optical device is configured to provide an input beam having a beam diameter less than half a distance between beam axes of the first output beam and the second output beam.

DETAILED DESCRIPTION

The following detailed description of example implementations refers to the accompanying drawings. The same reference numbers in different drawings may identify the same or similar elements.

To conserve space within optical apparatus, there is a general desire to reduce the size of the optical assemblies used to measure wavelength (or frequency) in an optical locker. In current designs, the etalon, beam splitter, and any mirror arrangements are usually separated by some distance significantly larger than the width of the etalon. A more compact optical assembly can be made by collocating the etalon, beam splitter, and at least the first mirror of any mirror arrangement, i.e. such that the distance between the etalon and the other components is less than the width of the etalon.

Figure 1:
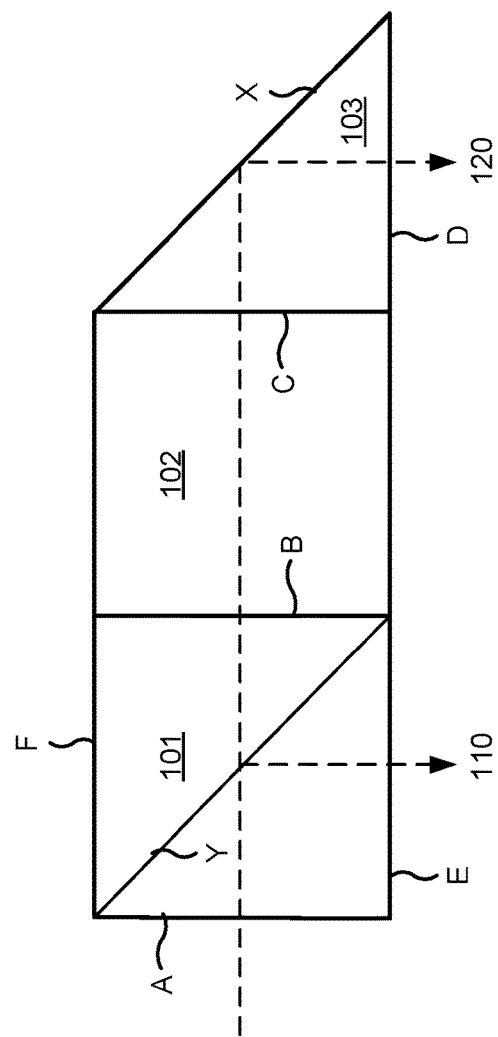
FIG. 1 illustrates an optical assembly having several unwanted optical cavities.

However, such an arrangement causes issues with additional cavities created by the other components. An example of this is illustrated in FIG. 1 for an optical assembly comprising a beam splitter 101, an etalon 102, and a prism 103 acting as a mirror. The beam splitter has an input surface A, a surface B which is shared with the etalon, a secondary output surface E, a beam splitter surface Y and an upper surface F. The etalon has surfaces B and C which are shared with the beam splitter and prism respectively. The prism has a surface C which is shared with the etalon, and an output surface D. Light (shown as a dotted line) passes through the optical assembly, resulting in a reference output 110 and an etalon output 120, which are then measured by detectors. Each of the surfaces A through F can form a cavity with each other surface (some requiring reflection from the mirror X or the beam splitter surface Y), and the desired etalon is only formed between surfaces B and C. Each of these cavities will act as an etalon, and will affect the signal received at the detectors, causing large errors. If the surfaces B and C are not shared between components, then additional cavities will be formed, such as between the output surface of the beam splitter and the input surface of the etalon.

Figure 2A:
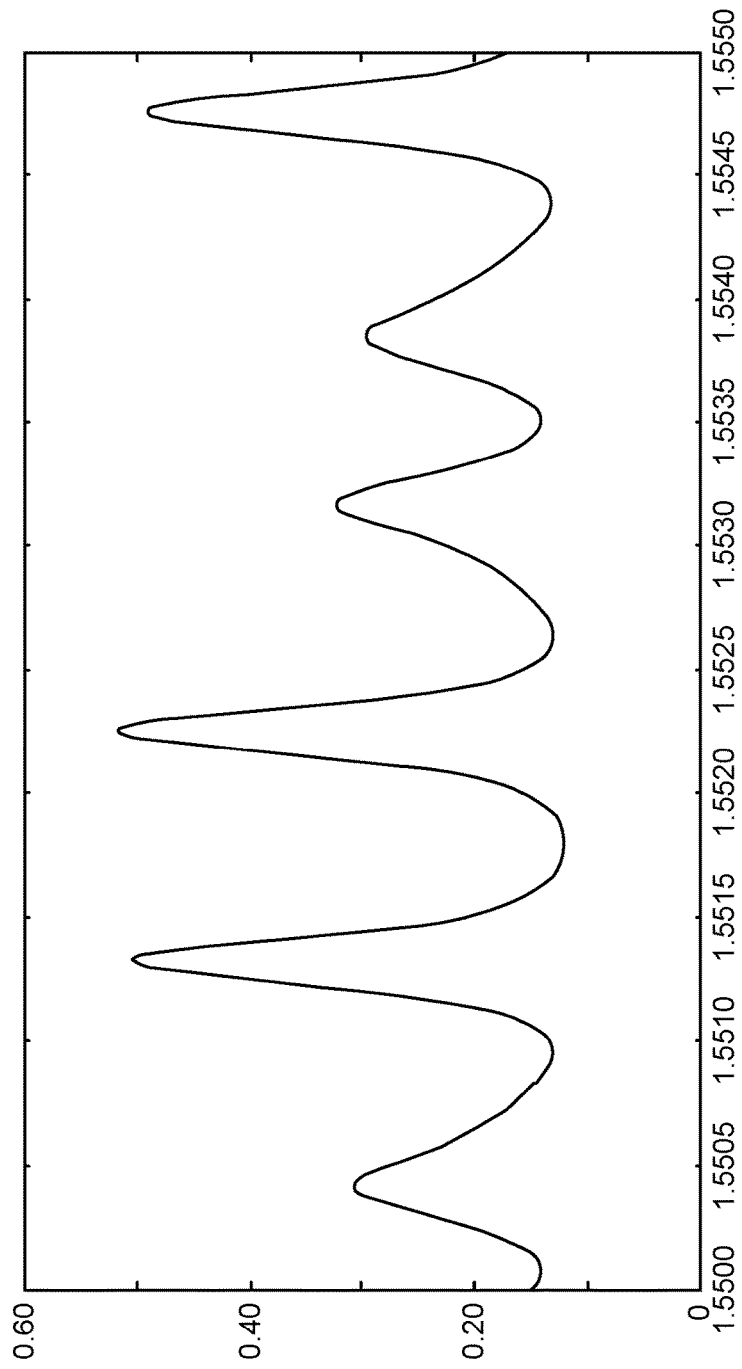
FIG. 2A shows the signal at the output detector for the assembly of FIG. 1.
Figure 2B:
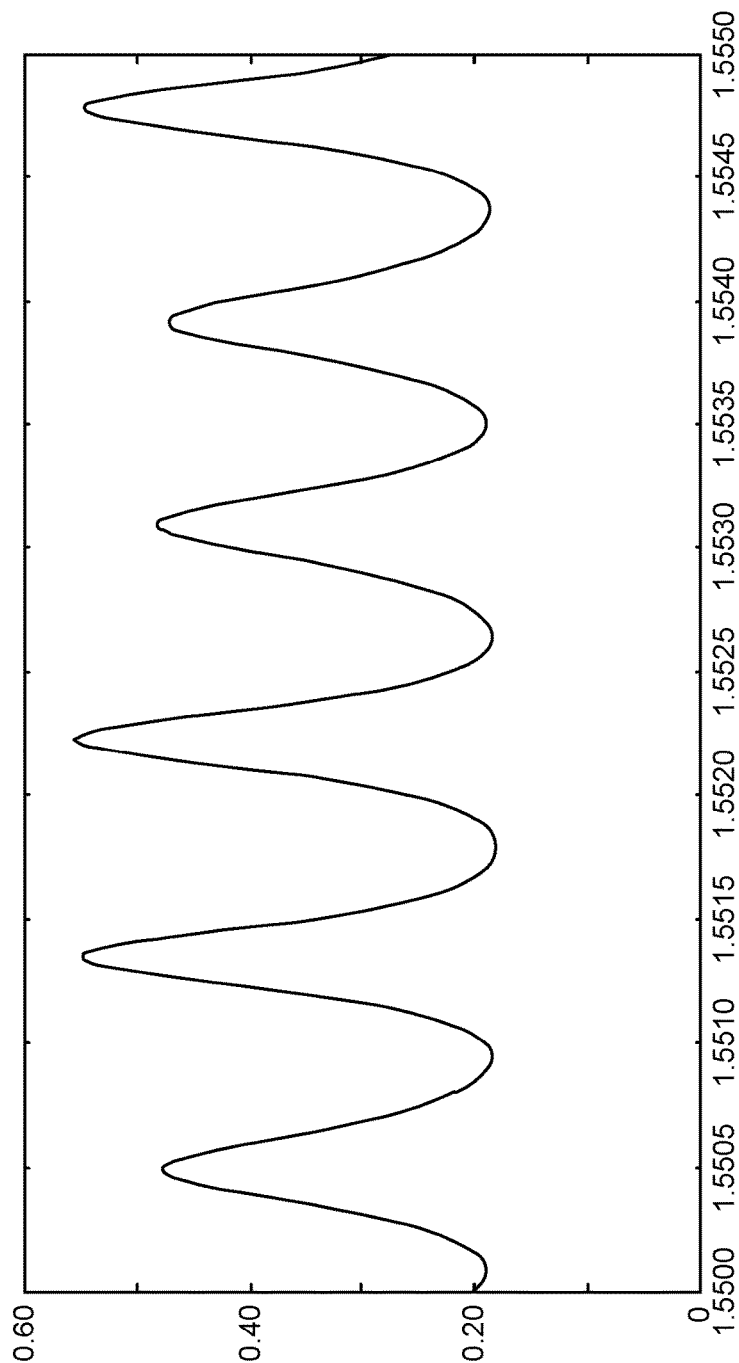
FIG. 2B shows the signal at the output detector for the assembly of FIG. 1, with the addition of anti-reflective coatings.

FIG. 2A shows the signal at the output detector from an exemplary optical assembly as shown in FIG. 1. Such a signal is practically unusable for optical locking, as the error is of a similar magnitude to the actual signal. This occurs because the additional cavities formed are of a similar scale to the desired etalon cavity, and so there are in effect several etalon signals of different cavity length being overlaid. FIG. 2B shows the output signal for an equivalent optical assembly with anti-reflective coatings applied to surfaces other than those of the desired etalon (i.e. other than B and C), which reduce reflections to 0.1% (around the state of the art for such coatings). While the signal is significantly improved compared to FIG. 2A, there is still a large amount of distortion visible in the graph. As such it is clear that anti-reflective coatings cannot be the entire solution here.

Figure 3:
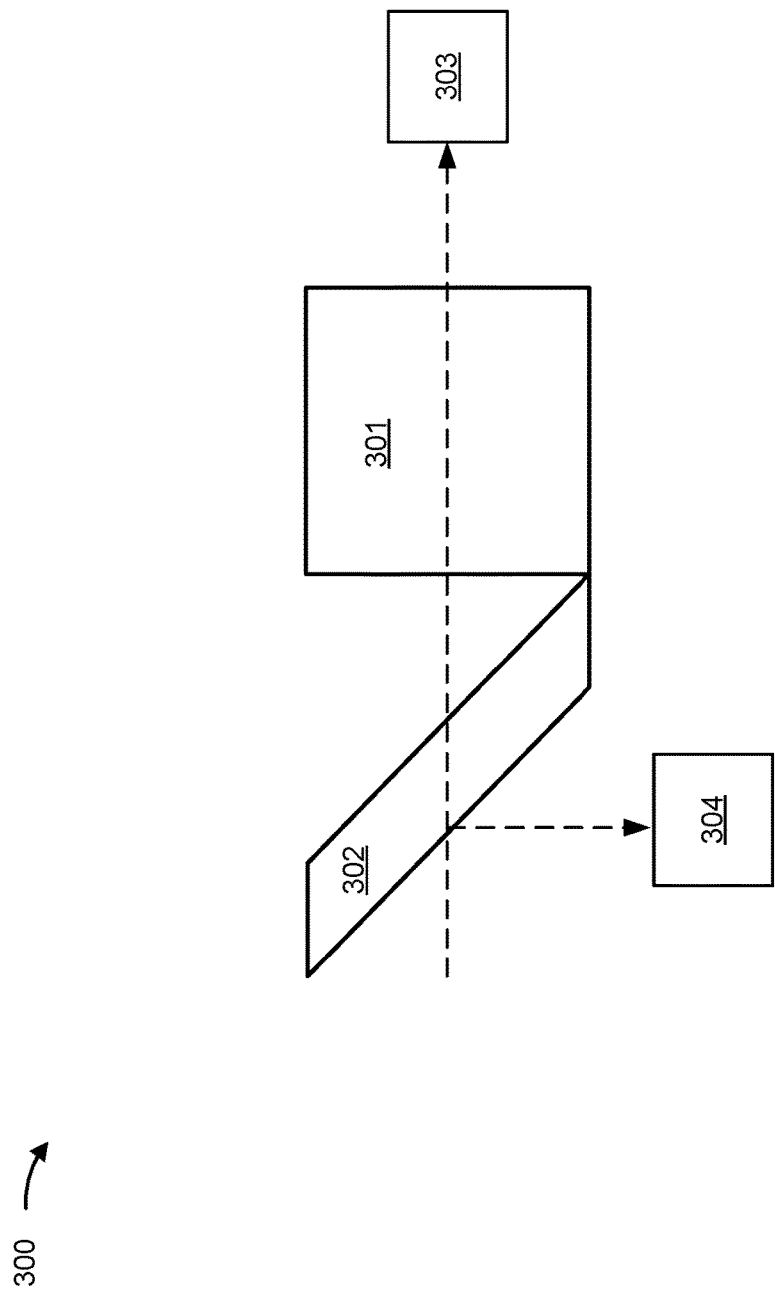
FIG. 3 illustrates an exemplary optical assembly.

An alternative design which eliminates the cavities is shown in FIG. 3. The optical assembly comprises an etalon 301, a plate beam splitter 302, an output detector 303 and a reference detector 304. In this example, the output detector 303 is located to directly receive light from the etalon 301 without the need for an intervening mirror. The plate beam splitter 302 is an optical component having a refractive index n and two parallel sides spaced a distance s apart. The plate beam splitter 302 will act as a beam splitter, sending one beam through the etalon 301, and another beam to the reference detector 304.

Figure 4:
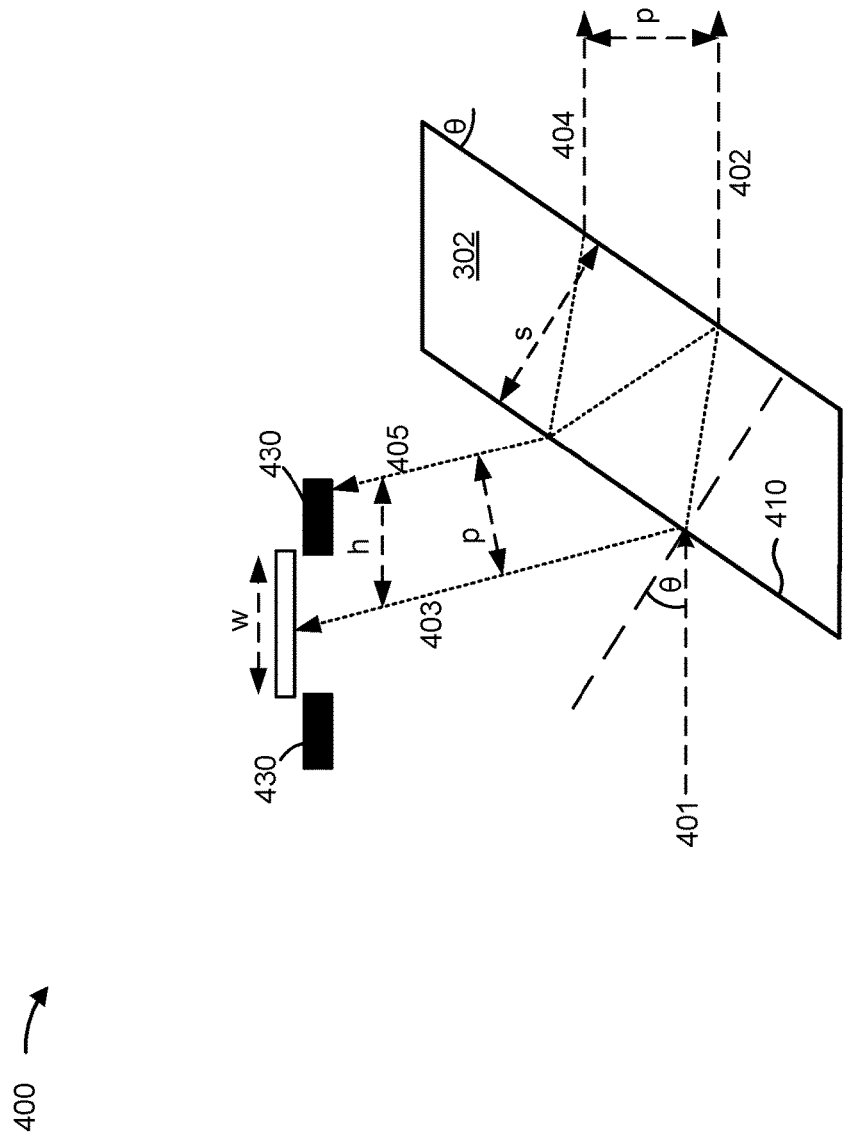
FIG. 4 is a close up view of the plate beam splitter in FIG. 3.

FIG. 4 is a close-up view of the plate beam splitter 302, showing the path of light through it. The input beam 401 is partially reflected each time it meets an interior surface of the plate beam splitter 302. The first output beam 402 is not reflected, and the first reference beam 403 is reflected only once. The first output beam 402 is sent to the etalon (in FIG. 4, this is the first output 402), and the first reference beam 403 is sent to the reference detector 304. As an alternative, the output and reference beams may be swapped—such as with the first reference beam 403 being the beam that is not reflected, and the first output beam 402 being the beam that is reflected only once.

There are additional beams generated at the plate beam splitter 302, including second output beam 404, second reference beam 405, and further output and reference beams (not shown). Each of these additional beams are reflected multiple times within the plate beam splitter 302, and would affect the readings obtained by the optical assembly. These can be somewhat reduced by the use of antireflective coatings on the first surface 410 (as neither of the desired output beams 402, 403 is reflected off this side), but this still results in significant detection of the additional beams 404, 405, and so on.

The distance p between the axes of each adjacent pair of beams on each side (e.g. between the first reference beam 403 and the second reference beam 405), as measured perpendicular to each beam, is given by $$p = 2s \tan\frac{\theta}{n}\cos\theta,$$

where θ is the angle of incidence between the input beam 401 and the first surface 410 (e.g., the angle between the input beam 401 and the normal to that surface), s is the thickness of the plate beam splitter 302, and n is the refractive index of the plate beam splitter 302. By positioning the detectors such that at least a portion of the second output or reference beams is excluded from the detectors, the interference from the additional beams can be greatly reduced. This may be achieved by ensuring that the detectors do not extend across the full width of the second output or reference beams, by providing an aperture 430 or other occluding element to block at least a portion of the second output or reference beams, or by any other suitable arrangement.

Figure 5:
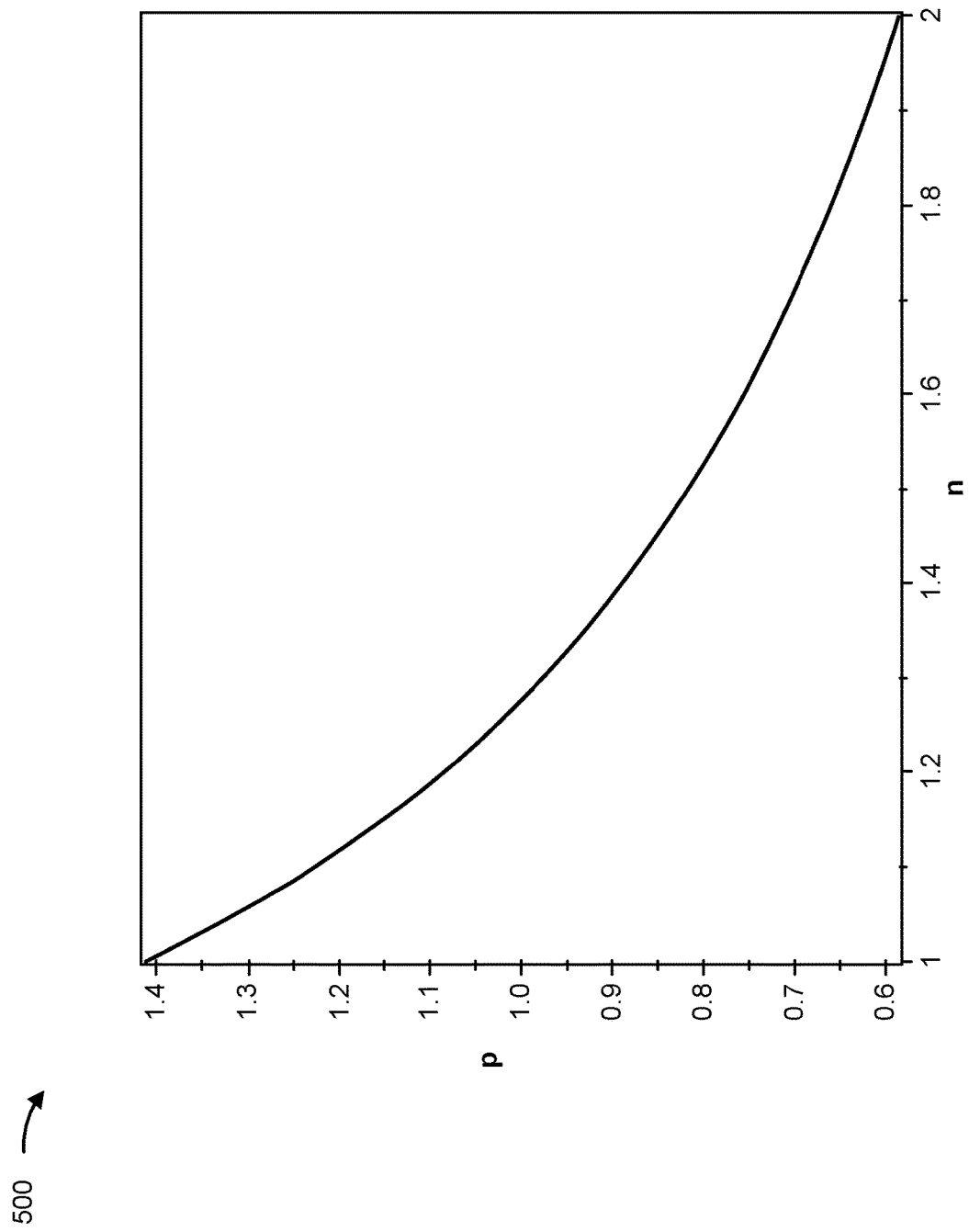
FIG. 5 is a graph of beam separation against refractive index for a plate beam splitter.

The angle of incidence of the input beam 401 to the plate beam splitter 302 can be anywhere from 0 to 90 degrees, though in practice a more restrictive range may be used to prevent intersection of the reference beam 403 with either the components generating the input beam 401 or the etalon (e.g., represented by the output beam 402). In order for one of the split beams to pass perpendicularly through the etalon, this angle of incidence is also the angle between the input face of the etalon and the output face of the plate beam splitter 302. For example, the angle of incidence may be 30 to 60 degrees, or, in some implementations, 45 degrees—as this simplifies the design of the optical assembly as the optical paths in and out of it are perpendicular. As shown in FIG. 5, a lower refractive index for the plate beam splitter 302 will result in a greater separation of the beams (e.g., the quantity p as defined above) at a given angle of incidence. The plot in FIG. 5 uses a plate beam splitter 302 of thickness 1 mm at a 45 degree angle of incidence. The lowest refractive index commonly available for silica glass is about 1.45, and using a higher refractive index does not provide an advantage here. As such, the refractive index will typically be less than 1.75, or, in some implementations, less than 1.5.

The beams will in general not be ideally collimated. For example, they may have a Gaussian profile. As such it is not possible to exclude all of the second output beam 404, as some tiny portion of it will extend to the beam axis of the first output beam 402. As potential guidelines for placing the detectors, they may be arranged to exclude at least the beam axis of the second output or reference beams, or to exclude all portions of the output or reference beams where the intensity of the beams is above a threshold fraction of the intensity on the beam axis.

In a typical example, the distance p between the beam axes is greater than twice the beam diameters. For a 1 mm plate with a refractive index of 1.5 and an angle of incidence of 45 degrees, this results in a beam separation of 815 microns and therefore is usable with a beam diameter of up to 407 microns. For a beam with a 300 micron diameter, an angle of incidence of 45 degrees, and a refractive index of 1.5, the plate has a required thickness of at least 740 microns to achieve the required 600 micron separation.

Figure 9B:
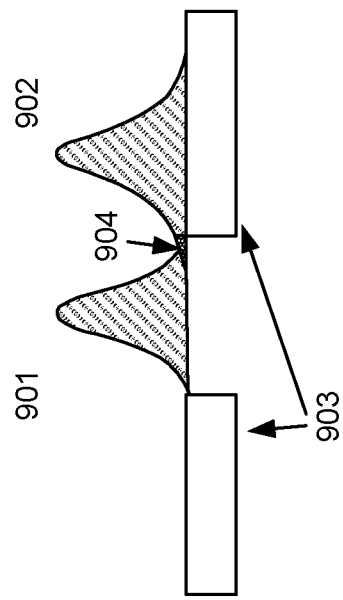
FIGS. 9A and 9B illustrate the passing of primary and secondary beams through an aperture.
Figure 9A:
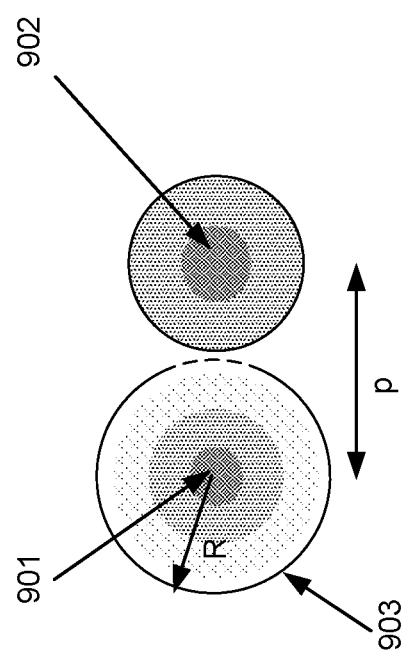

For a Gaussian beam, the beam radius may be defined as the distance between the beam center and the point where the intensity falls to $1/e^2$ of the maximum intensity, with the beam diameter being twice this radius. An alternative definition of the beam diameter is the full width at half maximum (FWHM). The acceptable separation between the beams depends on proportion of the secondary beam which can be acceptably detected, and can be calculated by the skilled person based on the beam parameters and the error which can be tolerated. This is illustrated in FIGS. 9A and 9B, which show a first beam 901 and a second beam 902 with their centers separated by a distance p passing through an aperture 903 of radius R. Due to the Gaussian profiles of the beams, a small portion 904 of the second beam will enter the aperture 903.

Figure 10:
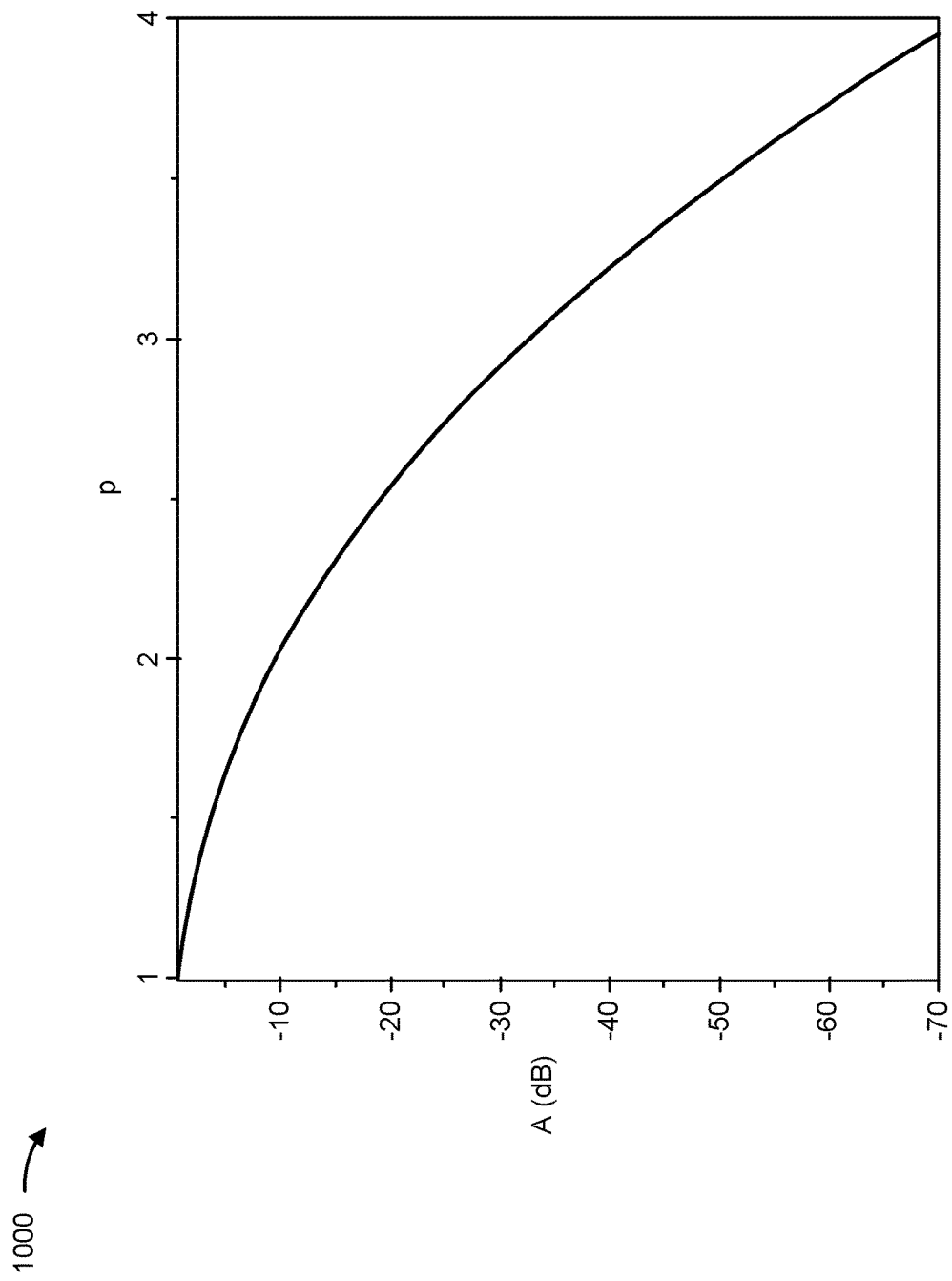
FIG. 10 is a graph of power attenuation against beam separation for a particular configuration.

For a first and second beam, where the first beam is the required output beam and the second beam is an unwanted interfering beam (e.g. a secondary beam from the plate beam splitter), FIG. 10 shows the power attenuation A from the second beam into the first beam vs the beam separation p as a multiple of the Gaussian beam radius as defined above. In this example, the detector is positioned and sized to receive 99% of the total intensity of the first beam. The p=4 value corresponds to a beam separation of twice the beam diameter, as described above, resulting in a power attenuation of about −70 dB. The power ratio of the first beam to the second beam as measured at the detector will be the negative of the power attenuation from the second beam into the first beam when measured in decibels. Accordingly, the above example has a power ratio of 70 dB.

Figure 11:
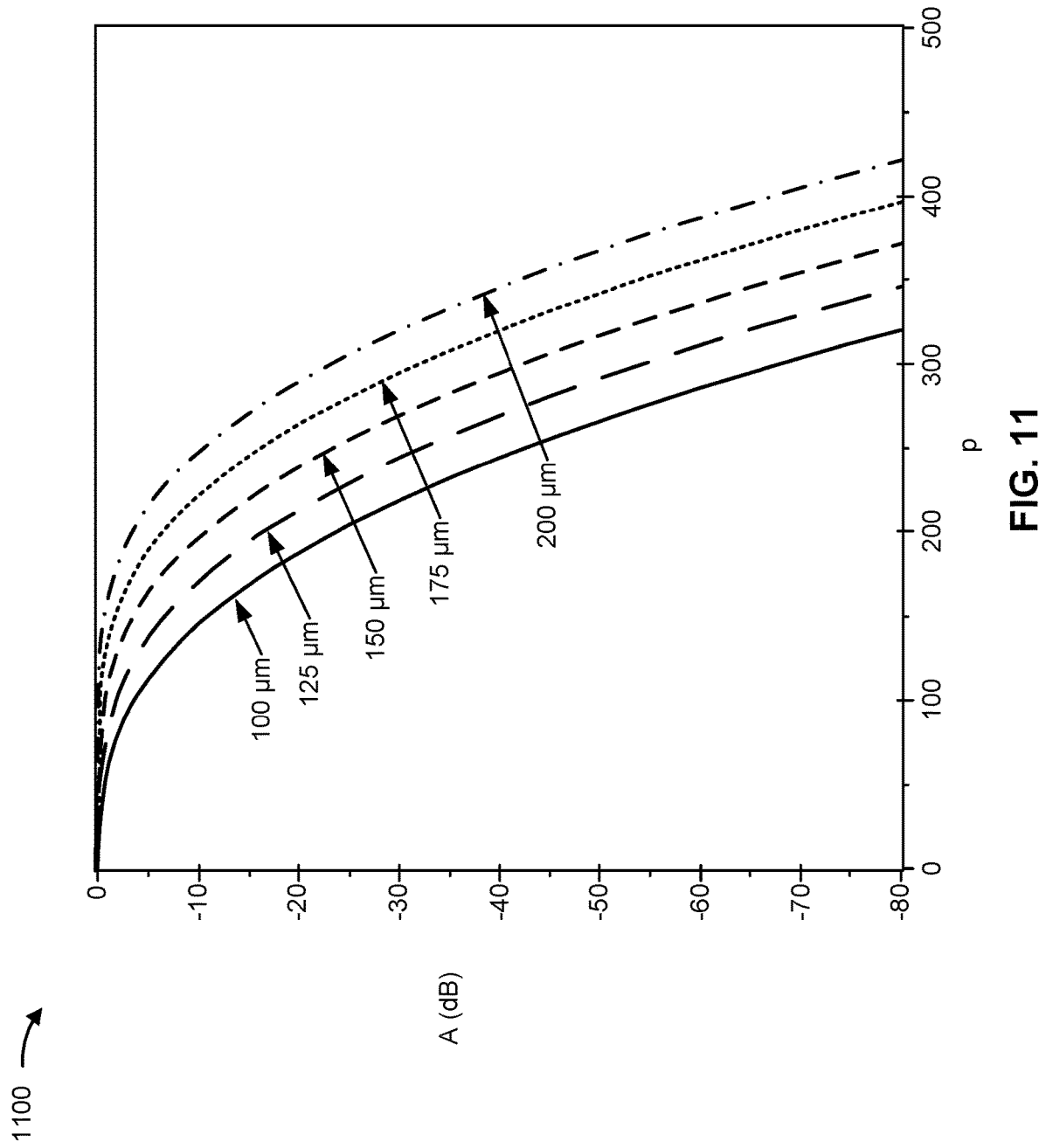
FIG. 11 is a graph of power attenuation against beam separation for a selection of example aperture sizes.

FIG. 11 shows the effect of aperture size and beam separation p on the power attenuation A, with a beam radius (e.g., $1/e^2$ radius) of 80 microns, for apertures of radius 100 microns, 125 microns, 150 microns, 175 microns, and 200 microns. FIG. 11 considers only the contribution to the power attenuation from the blocking of the secondary beam. For example, the first and second beam are assumed to be the same initial power. In practice, there will be additional power attenuation since the secondary beam is the result of additional reflections within the optical assembly. The aperture size may be defined by an external aperture, such as an opaque structure having an aperture which excludes light from the detector, or may be defined by the size of the sensitive area of the detector.

Figure 12:
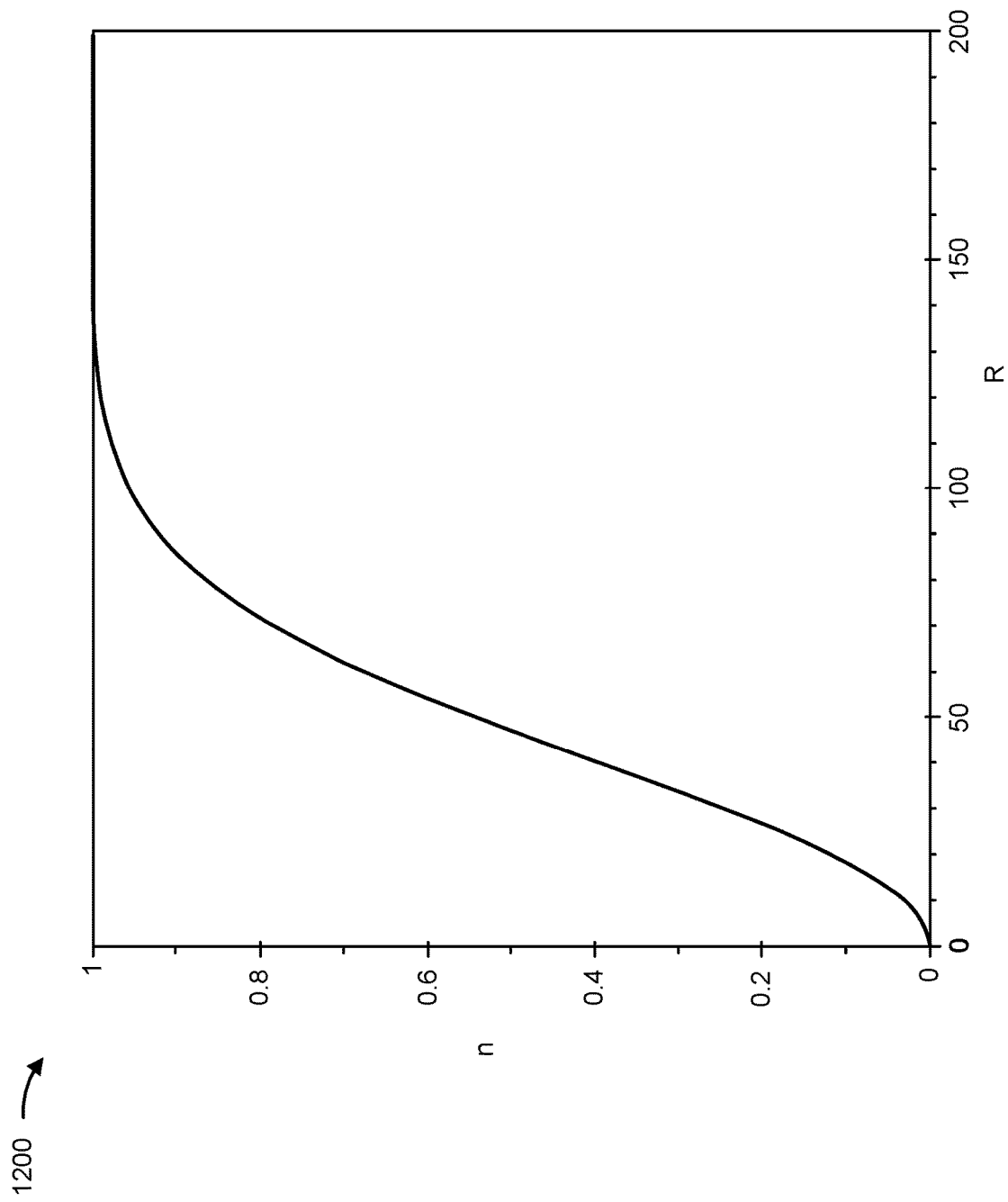
FIG. 12 is a graph of detection efficiency against aperture radius.

FIG. 12 shows the detection efficiency n of the first beam against aperture radius R for the same 80 micron beam radius as FIG. 11. As can be seen from FIGS. 11-12, the selection of aperture radius is a trade off between efficiency and interference. At lower aperture sizes, smaller beam separation is required to achieve a given level of power attenuation, but the detection efficiency of the desired output beam decreases. As an example, for a 100 micron aperture, about 96% of the beam power is detected, and the separation between beams can be reduced to 250 microns while maintaining an power ratio between the first and second beam of 45 dB. Other contributions to the attenuation of the secondary beam as described above would cause the total power ratio to be greater than 50 dB.

The geometry of the optical assembly may be configured to ensure that the power ratio of the first output beam to the second output beam as detected by the output detector is greater than a threshold. This threshold may be greater than 50 dB, greater than 60 dB, or greater than 70 dB.

To reduce the intensity of the additional beams from the plate beam splitter, one or both of its faces may be coated with an anti-reflective coating.

Figure 6:
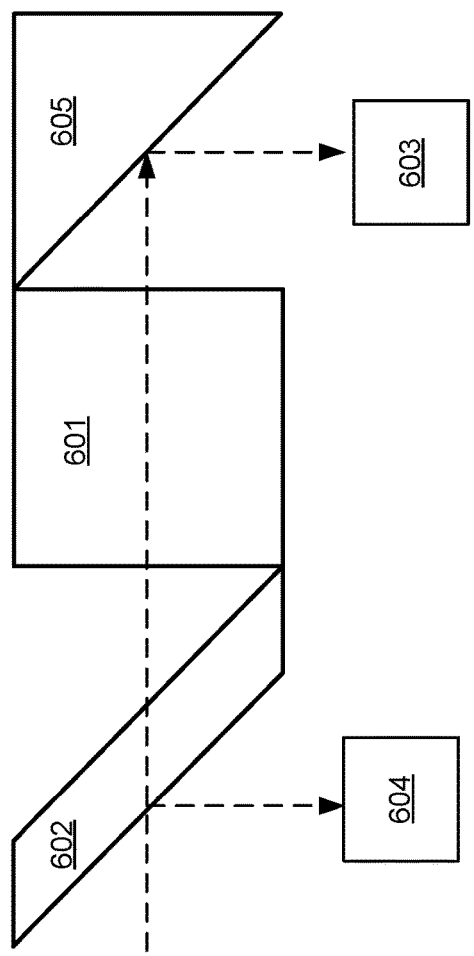
FIG. 6 illustrates a further exemplary optical assembly.

FIG. 6 shows a further exemplary optical assembly. The optical assembly comprises an etalon 601, a plate beam splitter 602, a reference detector 604 which are equivalent to their implementations in FIG. 3. In addition, the optical assembly comprises a first surface mirror 605 which directs light to the output detector 603. A first surface mirror is a mirror where the reflective surface is the first surface encountered by incoming light, in contrast to a back surface mirror where light must travel into the component before being reflected. The use of a first surface mirror here means that there is no equivalent to the surface D as shown in FIG. 1 along the light path. This allows the output detector to be located off-axis for the etalon 601 (e.g. parallel to the reference detector, as shown), without introducing additional unwanted cavities that would cause interference. As an example, the first surface mirror 605 may be a prism, with the output beam from the etalon 601 incident on an angled face of the prism, and that face may have a reflective coating.

The optical assemblies described above may be mounted on a ceramic plate, for stability and to allow them to be installed into optical systems as a single unit.

Figure 7A:
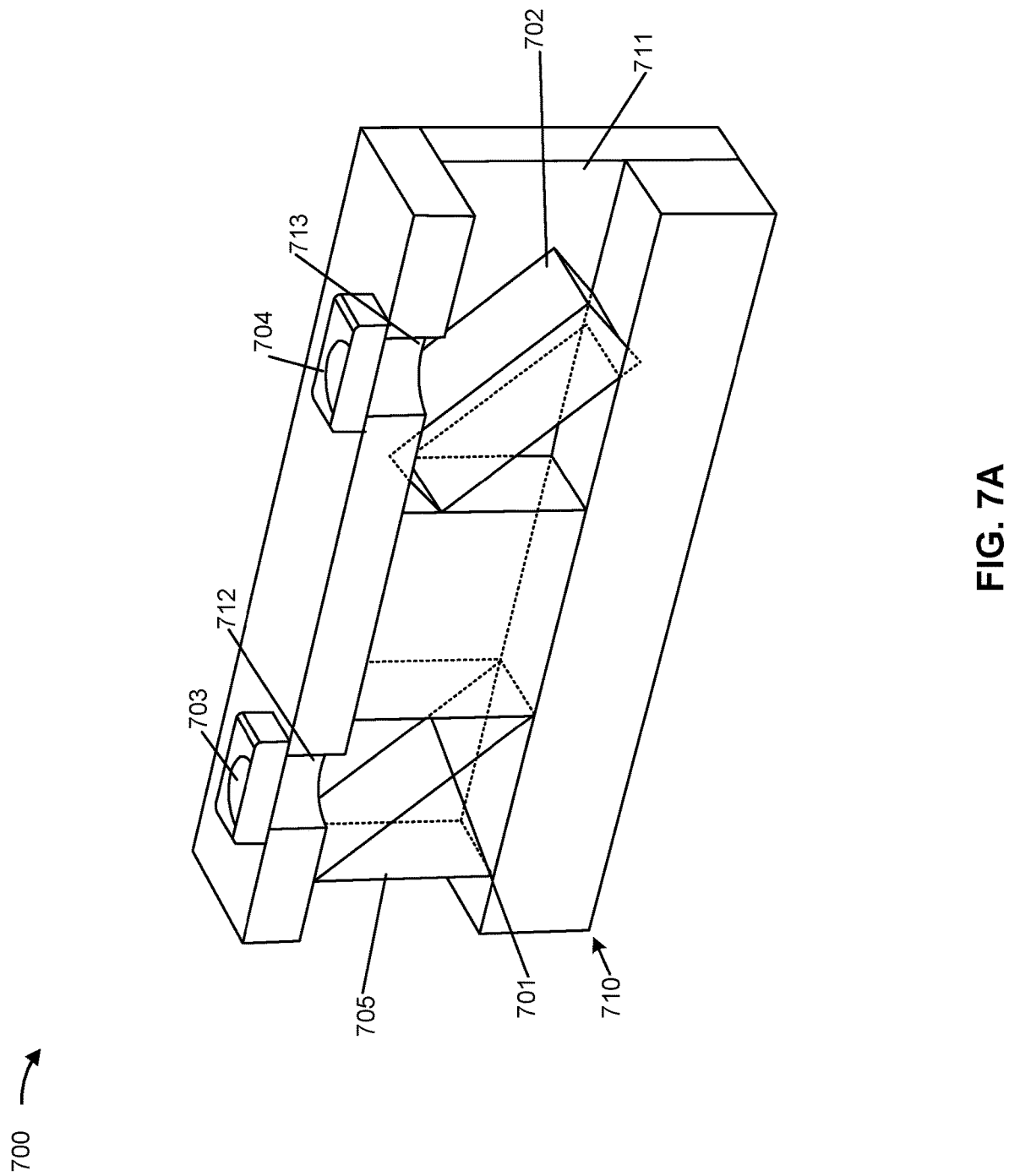
FIGS. 7A and 7B illustrate an enclosed optical assembly.
Figure 7B:
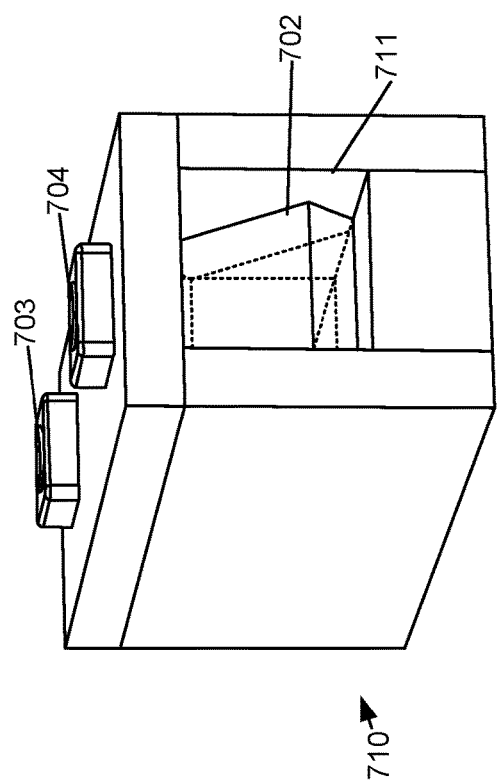

FIGS. 7A and 7B show an enclosed optical assembly. The optical assembly comprises an etalon 701, a plate beam splitter 702, an output detector 703, a reference detector 704, and a first surface mirror 705, which are equivalent to their implementations in FIG. 6. The same principle of enclosing the assembly applies to the assembly illustrated in FIG. 3, except that the output detector would be located at the end of the enclosure in that case.

The etalon 701, the plate beam splitter 702, and the first surface mirror 705 are mounted within an enclosure 710. This mounting may be by any suitable means, such as by bonding the optical elements to the side wall of the enclosure 710, or by providing cutouts within the side wall which the optical elements can be seated within. The enclosure 710 has an input opening 711 through which an input beam can be provided. In the illustration of FIG. 7A, the enclosure 710 also has an output detector opening 712 and a reference detector opening 713, which permit light to pass through the enclosure 710 to the output and reference detectors, which are externally mounted on the enclosure. As an alternative, the output and reference detectors may be mounted within the enclosure 710. In FIG. 7A, the end of the enclosure opposite the input opening is open, but this may also be covered.

The enclosure is formed from an opaque material, such as a ceramic, and may be coated with an optical absorber on its inner surfaces to avoid reflections from the enclosure.

Figure 8:
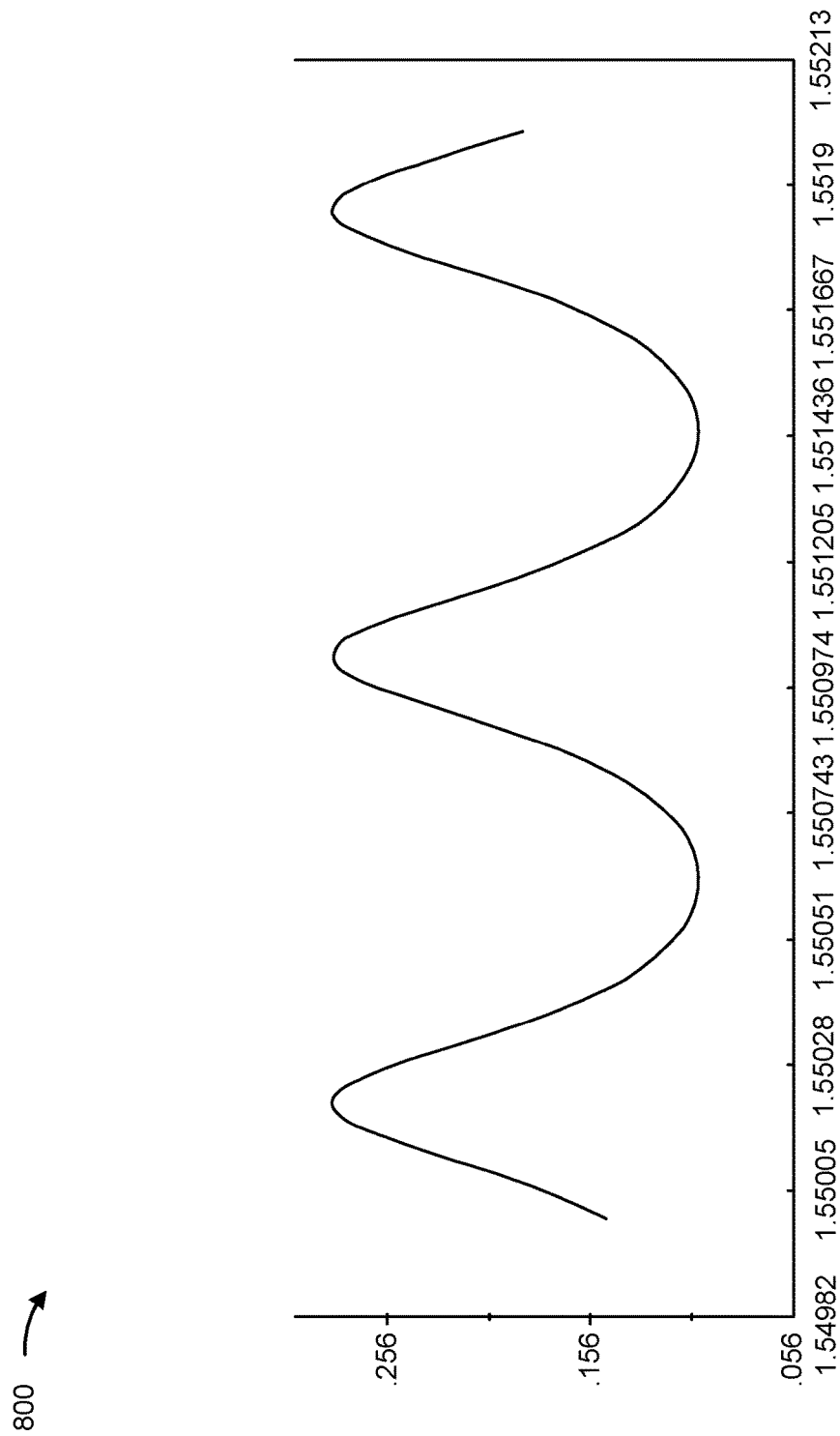
FIG. 8 shows the signal at the output detector for the assembly of FIG. 6.

FIG. 8 is a graph showing the output signal of an optical assembly as shown in FIG. 6. Comparing this to FIGS. 2A and 2B, it can be seen that there is essentially no distortion in the output signal, and the peaks in the sampled range are consistent with each other.

While the above disclosure has focused on an assembly comprising an etalon, it will be appreciated by the skilled person that the etalon may be replaced with an alternative optical cavity (also known as a resonating cavity or optical resonator).

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical assembly, comprising:
   an optical cavity;
   an output detector;
   a reference detector; and
   a plate beam splitter, wherein:
   the plate beam splitter has a first face and a second face, and is configured to form, from an input beam:
   a first output beam, that passes through the optical cavity and impinges the output detector,
   a first reference beam that impinges on the reference detector,
   a second output beam parallel to the first output beam, and
   a second reference beam parallel to the first reference beam;
   one of the first output beam or the first reference beam is a reflection of the input beam in the first face of the plate beam splitter, wherein:
   a distance between beam axes of the first output beam and the second output beam as measured perpendicular to each output beam is 2s tan θ/n cos θ, and
   a distance between beam axes of the first reference beam and the second reference beam as measured perpendicular to each reference beam is $$2s\tan\frac{\theta}{n}\cos\theta,$$

wherein:
   s is a thickness of the plate beam splitter, θ is an angle of incidence of the input beam on the plate beam splitter, and n is a refractive index of the plate beam splitter;
   the output detector is configured to exclude at least a portion of the second output beam; and the reference detector is configured to exclude at least a portion of the second reference beam.

2. The optical assembly of claim 1, further comprising a first surface mirror located on another side of the optical cavity from the plate beam splitter, and positioned such that light transmitted through the optical cavity reflects off the first surface mirror and is transmitted to the output detector.

3. The optical assembly of claim 2, wherein the first surface mirror is a prism arranged such that the first output beam reflects from an outer surface of the prism after passing through the optical cavity.

4. The optical assembly of claim 1, wherein the plate beam splitter has an anti-reflective coating on at least one of the first face or the second face.

5. The optical assembly of claim 1, wherein the optical cavity and the plate beam splitter are contained within a housing, the housing having an opening configured to receive the input beam.

6. The optical assembly of claim 5, wherein at least one of the output detector or the reference detector are located within the housing.

7. The optical assembly of claim 5, wherein at least one of the output detector or the reference detector are located outside of the housing, and the housing has one or more openings to allow light to reach the output detector and the reference detector.

8. The optical assembly of claim 5, further comprising a light absorbing coating on an inside surface of the housing.

9. The optical assembly of claim 1, further comprising an opaque structure associated with each of the output detector and the reference detector,
wherein each opaque structure is configured to block at least a portion of the respective second output beam or second reference beam from reaching the respective output detector or reference detector.

10. The optical assembly of claim 9, wherein the opaque structure is an aperture having a width less than a distance between beam axes of the first output beam and the second output beam.

11. The optical assembly of claim 1, wherein an angle of incidence θ of the input beam on the plate beam splitter is 45 degrees.

12. The optical assembly of claim 1, wherein the optical cavity is an etalon.

13. An optical assembly, comprising:
an optical cavity;
an output detector configured to receive light transmitted through the optical cavity;
a reference detector; and
a plate beam splitter located adjacent to an input face of the optical cavity, and slanted at an angle θ to the input face, the plate beam splitter configured to split an input beam into a first output beam that passes through the optical cavity to the output detector, and a first reference beam that strikes the reference detector,
wherein the output detector and reference detector are configured such that:
the output detector detects light from the first output beam and from a second output beam located parallel to and a perpendicular distance p=2s tan θ/n cos θ from the first output beam, where s is a thickness of the plate beam splitter and n is a refractive index of the plate beam splitter,
wherein a power ratio of the first output beam to the second output beam as detected by the output detector is greater than a threshold, and the reference detector detects light from the first reference beam and from a second reference beam located parallel to and a perpendicular distance p=

$$2s \tan\frac{\theta}{n}\cos\theta$$

from the first reference beam,
wherein a power ratio of the first reference beam to the second reference beam as detected by the reference detector is greater than the threshold.

14. The optical assembly of claim 13, wherein the threshold is greater than 50 dB.

15. The optical assembly of claim 13, further comprising a first surface mirror located on another side of the optical cavity from the plate beam splitter, and positioned such that light transmitted through the optical cavity reflects off the first surface mirror and is transmitted to the output detector.

16. The optical assembly of claim 13, wherein the optical cavity and the plate beam splitter are contained within a housing, the housing having an opening configured to receive the input beam.

17. The optical assembly of claim 16, wherein at least one of the output detector or the reference detector are located within the housing.

18. The optical assembly of claim 13, wherein the optical cavity is an etalon.

19. An optical system, comprising:
an optical assembly, including:
an optical cavity;
an output detector;
a reference detector; and
a plate beam splitter, wherein:
the plate beam splitter has a first face and a second face, and is configured to form, from an input beam:
a first output beam, that passes through the optical cavity and impinges the output detector,
a first reference beam that impinges on the reference detector,
a second output beam parallel to the first output beam, and
a second reference beam parallel to the first reference beam;
one of the first output beam or the first reference beam is a reflection of the input beam in the first face of the plate beam splitter, wherein:
a distance between beam axes of the first output beam and the second output beam as measured perpendicular to each output beam is 2s tan θ/n cos θ, and
a distance between beam axes of the first reference beam and the second reference beam as measured perpendicular to each reference beam is $$2s \tan\frac{\theta}{n}\cos\theta$$

wherein:
s is a thickness of the plate beam splitter, θ is an angle of incidence of the input beam on the plate beam splitter, and n is a refractive index of the plate beam splitter, and
the input beam has a beam diameter less than half the distance between beam axes of the first output beam and the second output beam;

the output detector is configured to exclude at least a portion of the second output beam; and the reference detector is configured to exclude at least a portion of the second reference beam.

20. The optical system of claim 19, wherein the optical cavity is an etalon.

\* \* \* \* \*